United States Patent [19]

Yamada et al.

[11] Patent Number: 5,638,289
[45] Date of Patent: Jun. 10, 1997

[54] METHOD AND APPARATUS ALLOWING HOT REPLACEMENT OF CIRCUIT BOARDS

[75] Inventors: Yuichi Yamada; Hirohiko Kizu, both of Kawasaki, Japan

[73] Assignee: Fujitsu Limited, Kawasaki, Japan

[21] Appl. No.: 405,863

[22] Filed: Mar. 17, 1995

[30] Foreign Application Priority Data

Mar. 18, 1994 [JP] Japan ................... 6-047620

[51] Int. Cl.[6] ................... H01H 37/06
[52] U.S. Cl. ................... 364/489
[58] Field of Search ................... 395/750, 500, 395/283; 307/64, 147; 326/9; 361/58; 364/488, 489, 490, 491

[56] References Cited

U.S. PATENT DOCUMENTS

| | | | |
|---|---|---|---|
| 4,874,960 | 10/1989 | Cybela | 307/64 |
| 5,118,970 | 6/1992 | Olson et al. | 326/9 |
| 5,204,963 | 4/1993 | Noya et al. | 395/750 |
| 5,210,855 | 5/1993 | Bartol | 395/500 |
| 5,317,697 | 5/1994 | Husak et al. | 395/283 |
| 5,384,492 | 1/1995 | Carlson et al. | 307/147 |
| 5,414,861 | 5/1995 | Horning | 395/750 |
| 5,473,499 | 12/1995 | Wier | 361/58 |

*Primary Examiner*—Kevin J. Teska
*Assistant Examiner*—Dan Fiul
*Attorney, Agent, or Firm*—Staas & Halsey

[57] ABSTRACT

A circuit board that can be replaced or removed for repair from an information processing device, and which can be reinstalled without allowing backup-mode power to reach circuits on the circuit board during reinstallation. The circuit board for the information processing device includes a load that is mounted on the circuit board and that is supplied with normal or backup power. A switch is coupled to the load and has a first state that allows the backup power to be supplied to the load and a second state in which the backup power is inhibited from being applied to the load when either normal power is supplied to the load or no power is supplied to the circuit board.

20 Claims, 8 Drawing Sheets

F I G. 1
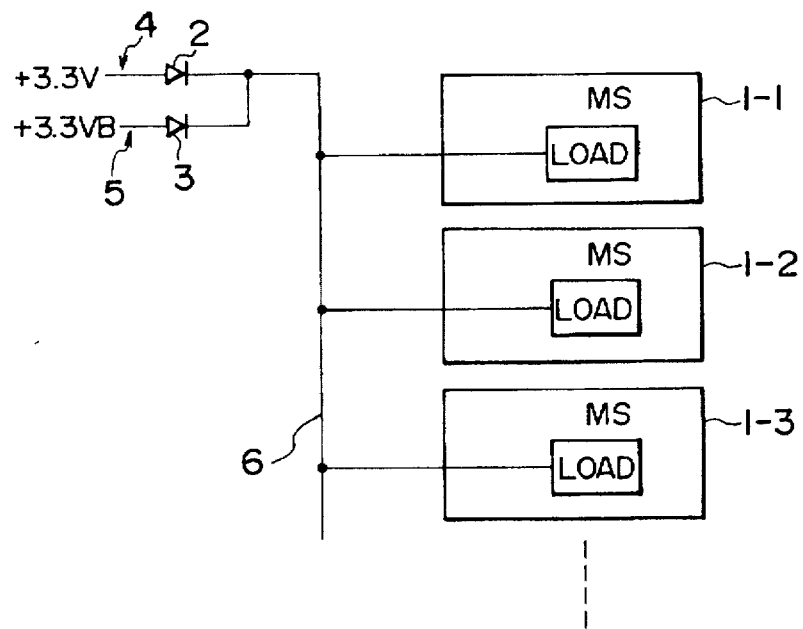
F I G. 2
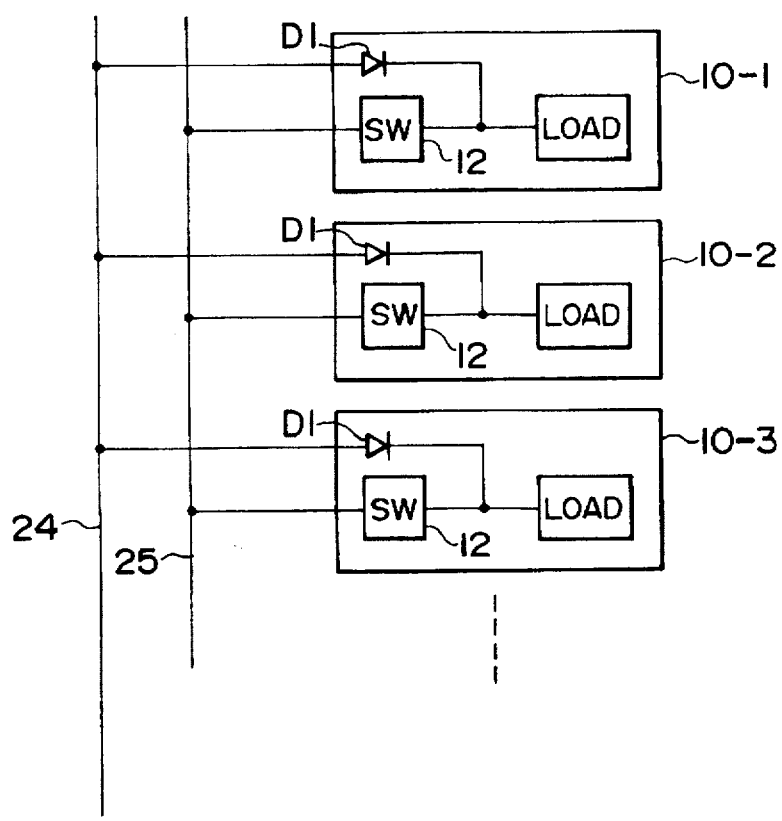

F I G. 7
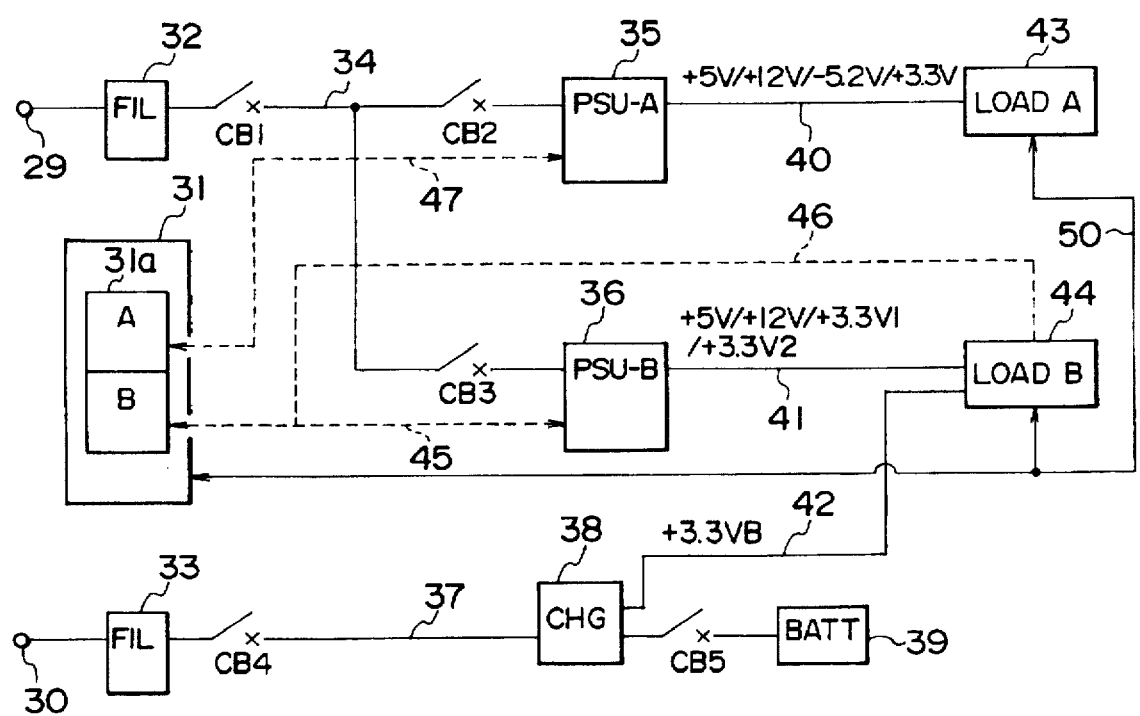

F I G. 9
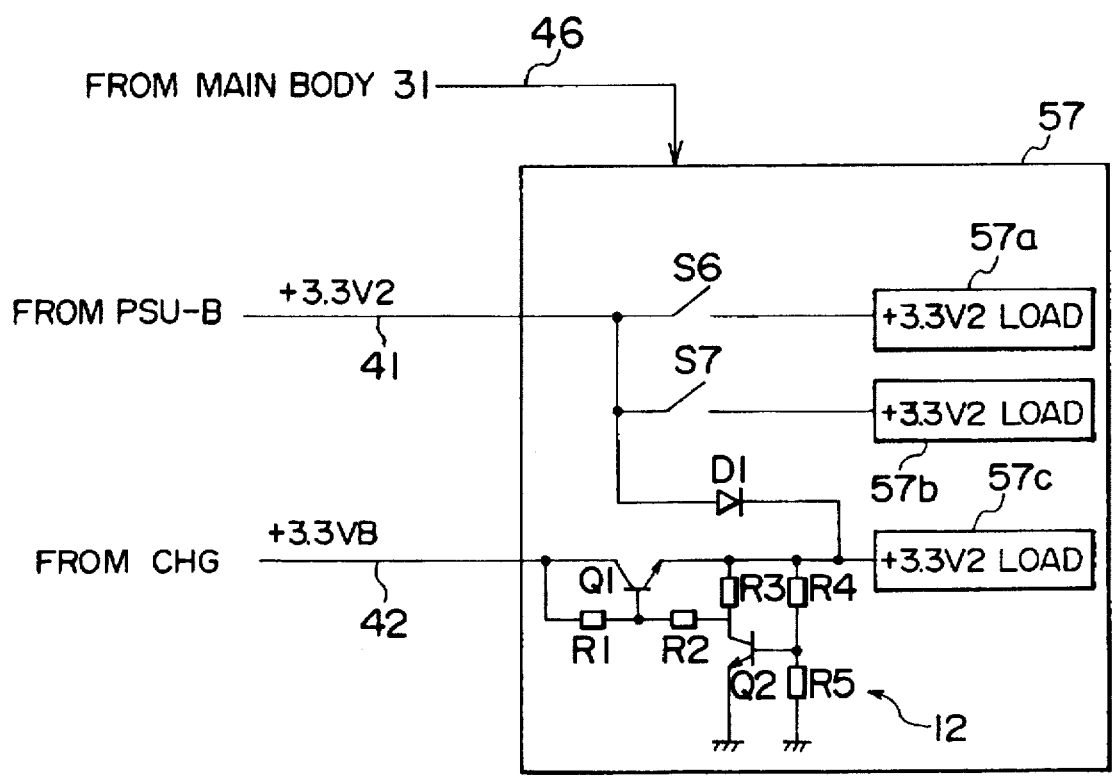

METHOD AND APPARATUS ALLOWING HOT REPLACEMENT OF CIRCUIT BOARDS

BACKGROUND OF THE INVENTION

1. Field of the Invention

The present invention generally relates to circuit boards used for information processing devices such as electronic computers. More particularly, the present invention is concerned with a circuit board having a normal operation mode and a backup operation mode, and an information processing device having such a circuit board.

Information processing devices such as electronic computers are supplied with power as long as the devices are working. When the power supply is completely stopped, the computers do not work at all. However, some computers are required to save information stored in memories of the computers even when the power supply is OFF. For example, there are computers which are not required to process jobs in the night, holidays or the like, but are required to save information stored in the memories. Such computers are employed by bankers or the like. In such cases, the memories are supplied with power in a backup mode (which is also called a hot-standby state), in which the power is generated by a backup power supply unit, such as a battery. This is also the case when a power failure or a power cut takes place.

Generally, a maintenance operation is carried out in the normal operation mode or the completely disabled state. However, recently, it has been desired that the maintenance operation be carried out in the backup operation mode. For example, when a fault has occurred in a circuit board such as a printed circuit board on which memory chips (loads) are mounted, the faulty circuit board maintained in the backup mode is replaced by a new one while the other circuit boards are kept activated in the backup mode. In the maintenance operation, it is necessary for the computer system set in the backup mode to be affected by the replacement operation.

2. Description of the Prior Art

FIG. 1 is a block diagram of a part of a conventional computer, which has a plurality of memory boards including memory boards 1-1, 1-2, 1-3, on which memory chips (ICs) are mounted. The memory boards 1-1–1-3 are connected to a power supply line to which a normal operation power supply line 4 is coupled via a diode 2 and a backup power supply line 5 is coupled via a diode 3. A power supply unit for the normal operation (not shown) is connected to the line 4, and backup power supply unit for the backup operation (not shown) is connected to the line 5. Of course, other lines such as address bus lines and data bus lines are provided on the circuit boards and are connected to a main body or host device (not shown) of the computer via connectors and bus lines.

The memory boards 1-1 through 1-3 can be operated in either the normal operation mode or the backup operation mode. In the normal operation mode, the memory boards 1-1 through 1-3 are supplied with a dc power supply voltage via the normal operation power supply line 4, the diode 2 and the power supply line 6. In the example shown in FIG. 1, the power supply voltage is 3.3 V. In the backup operation mode, the memory boards 1-1 through 1-3 are supplied with a dc backup power supply voltage via the backup operation power supply line 5, the diode 3 and the power supply line 6. In the example shown in FIG. 1, the backup power supply voltage is also 3.3 V. In FIG. 1, the backup power supply voltage 3.3 V is illustrated as VB.

Each of the memory boards 1-1 through 1-3 is equipped with a mode setting function controlled by an upper device or a main body (frame) or a host device of the computer. For example, the mode setting function is implemented by an electronic mode setting switch, which is controlled by a control signal from the main body of the computer. When the memory boards 1-1 through 1-3 are set to the backup mode by turning OFF the corresponding mode setting switches, only some memory chips in each of the memory boards 1-1 through 1-3 are connected to the power supply line 6. In the backup operation mode, the backup operation power supply unit is connected to the line 5, while the normal operation power supply unit is disconnected from the line 4. In this state, the memory boards 1-1 through 1-3 are operated in the backup mode in which some memory chips are not supplied with power. For example, each of the memory boards 1-1 through 1-3 consumes power equal to, for example, one tenth of the power consumed in the normal operation mode.

When the computer is switched from the backup operation mode to the normal operation mode, the normal power supply unit is connected to the line 4, and the backup operation power supply unit is disconnected from the line 5. Further, the computer main body turns ON the mode setting switches of the memory boards 1-1 through 1-3.

As described before, it is desired that the maintenance operation be carried out without completely turning OFF the whole computer. In other words, it is desired to save information stored in the memories even when the computer main body does not process the jobs at all. If a fault has occurred in the memory board 1-1, this faulty memory board 1-1 is replaced by a new one or repaired one in the backup operation mode. It will be noted that the other memory boards are kept active in the backup operation mode and information stored therein is saved.

When the faulty memory board 1-1 is detached from the computer in the backup operation mode, the supply of electricity to the mode setting switch of the board 1-1 is stopped and the mode setting switch is switched to the original state, so that all the memory chips on the board 1-1 are set in the normal operation mode. That is, all the memory chips on the board 1-1 will be supplied with power if the board 1-1 is connected to the line 6 again after it is repaired. The same situation as described above takes place when a new memory board is connected to the line 6. The built-in switch is in the original state (normal operation mode), and thus all the memory chips on the new memory board is supplied with power.

When the repaired memory board or the new memory board is connected to the line 6 in the state in which the computer is in the backup operation mode, the above board operates in the normal operation mode until it is set to the backup operation mode, and hence consumes power as much as the board consumes in the normal operation mode. The power supply unit used in the backup operation mode is a battery. Hence, the sufficient driving ability of the battery will be lost soon after the repaired memory mode or the new one is connected to the line 6. Hence, it is inhibited from performing the repair or replacement operation on the memory boards in the backup operation mode.

SUMMARY OF THE INVENTION

It is a general object of the present invention to provide a circuit board and an information processing device in which the above disadvantages are eliminated.

A more specific object of the present invention is to provide a circuit board which can be replaced by a new one or connected again after repairing it in the backup mode without affecting other circuit boards operating in the backup mode and to provide an information processing device having such a circuit board.

The above objects of the present invention are achieved by a circuit board adapted to an information processing device comprising:

a load which mounted on the circuit board and supplied with a normal operation power supply voltage in a normal operation mode and a backup operation power supply voltage in a backup operation mode; and a switch coupled to the load, the switch having a first state in which the backup operation power supply voltage is allowed to be applied to the load in the backup operation mode, and a second state in which the backup operation power supply voltage is inhibited from being applied to the load in the normal operation mode or when no electricity is supplied to the circuit board.

The above objects of the present invention are also achieved by an information processing device comprising:

a main body performing information processing;

a circuit board controlled by the main body;

a first power supply line to which a normal power supply voltage is applied to the circuit board; and a second power supply line to which a backup power supply voltage is applied to the circuit board, the circuit board comprising:

a load supplied with the normal operation power supply voltage in a normal operation mode and the backup operation power supply voltage in a backup operation mode; and a switch coupled to the load, the switch having a first state in which the backup operation power supply voltage is allowed to be applied to the load in the backup operation mode and a second state in which the backup operation power supply voltage is inhibited from being applied to the load in the normal operation mode or when no electricity is supplied to the circuit board.

BRIEF DESCRIPTION OF THE DRAWINGS

Other objects, features and advantages of the present invention will become more apparent from the following detailed description when read in conjunction with the accompanying drawings, in which:

FIG. 1 is a block diagram of a part of a conventional information processing device;

FIG. 2 is a block diagram of the principle of the present invention;

FIG. 7 is a block diagram schematically illustrating the overall structure of the information processing device according to the embodiment of the present invention;

FIG. 9 is a block diagram of a load corresponding to a circuit board.

DESCRIPTION OF THE PREFERRED EMBODIMENT

Figure 3:
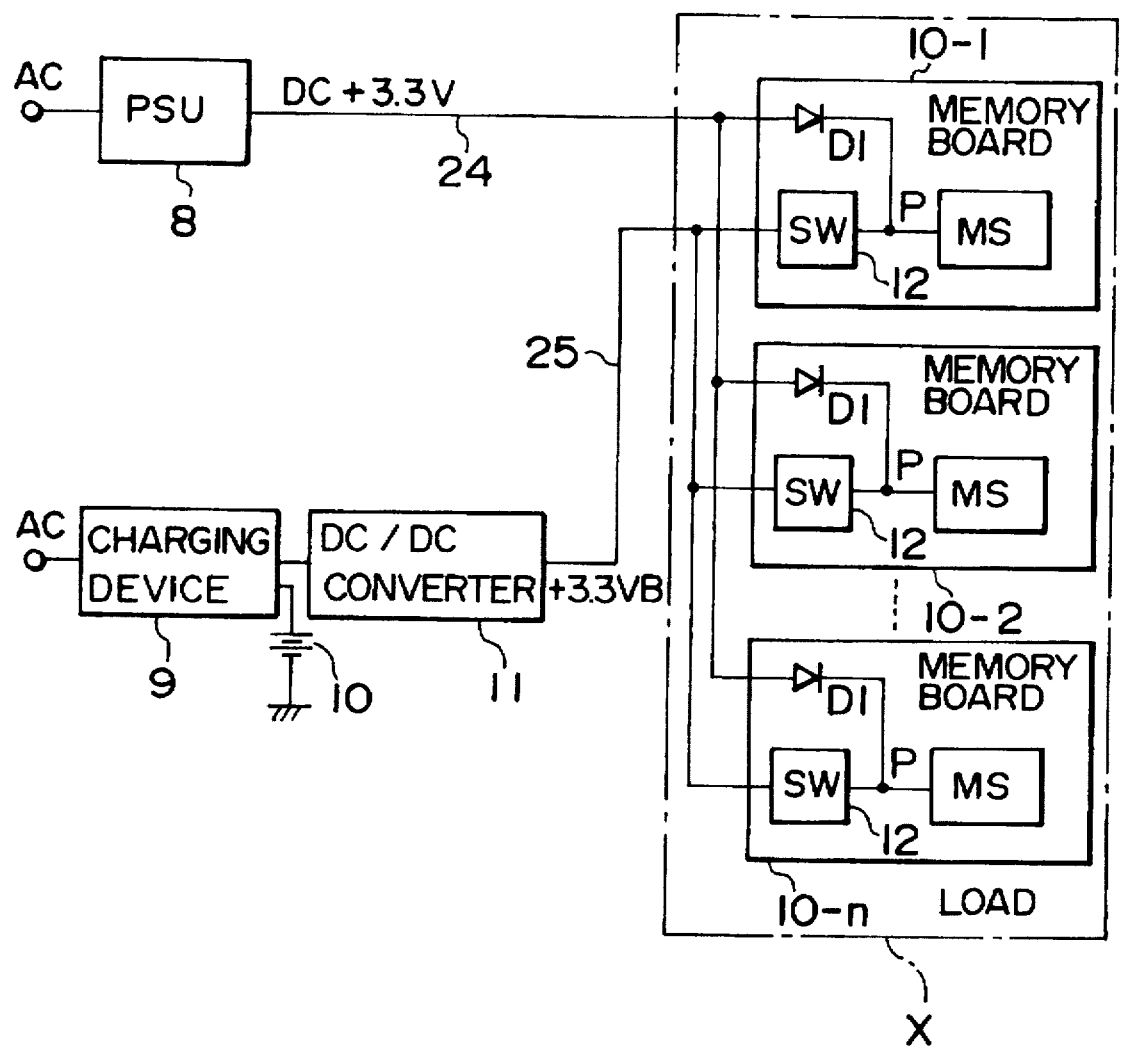
FIG. 3 is a block diagram of an essential part of an information processing device according to an embodiment of the present invention.

FIG. 2 is a block diagram of the principle of the present invention and shows a part of an information processing device. There are provided a plurality of circuit boards such as memory boards including memory boards 10-1, 10-2 and 10-3, which are connected to a normal operation power supply line 24 and a backup operation power supply line 25. For the sake of convenience, the following description will be given as if the information processing device has the memory boards 10-1, 10-2 and 10-3. Each of the memory boards 10-1, 10-2 and 10-3 has a diode D1 and a power supply switch (SW) 12. The anode of the diode D1 in each of the memory boards 10-1 through 10-3 is connected to the normal operation power supply line 24, the cathode thereof is connected to a load such as a memory circuit or a memory chip. The switch 12 in each of the memory boards 10-1 through 10-3 has a first end connected to the backup operation power supply line 25, and a second end connected to the memory chip and the cathode of the diode D1.

In the normal operation mode, a normal power supply voltage is applied to the loads of the memory boards 10-1 through 10-3 via the power supply line 24 and the diodes D1. When it is required to operate the computer in the backup operation mode, the supply of the normal power supply voltage is terminated, whereas a supply of a backup power supply voltage via the power supply line 25 is initiated. More particularly, the supply of the backup power supply voltage is initiated, and thereafter the supply of the normal power supply voltage is terminated. During the transient period, both the normal power supply voltage and the backup power supply voltage are applied to the memory boards 10-1 through 10-3. During this transient period, the switches 12 are maintained in the ON state, so that the memory chips that are the loads of the boards 10-1 through 10-3 are supplied with the power from the normal operation power supply and the power from the backup operation power supply.

After the supply of the normal operation power supply voltage is stopped, only the backup operation power supply voltage is supplied to the memory chips of the boards 10-1 through 10-3 via the respective switches 12.

In the backup operation mode, it is possible to detach one or more memory boards from the computer and attach these boards thereto again after repairing the boards or replace the boards with new ones. For example, when the memory board 10-1 is detached from the power supply lines 24 and 25, no electricity becomes supplied thereto. Thereby, the switch 12 is turned OFF from ON. Each of the switches 12 is designed so that, even if the detached board 10-1 is connected, again, to the power supply lines 24 and 25 of the computer maintained in the backup mode, the switch 12 is retained in the OFF state. Hence, no electricity from the backup operation power supply is yet supplied to the board 10-1. Hence, the attachment of the board 10-1 does not affect the other memory boards 10-2 and 10-3 maintained in the backup mode at all.

The above holds true for replacement of the boards. The switch 12 of a new memory board is OFF, and no backup operation electricity is supplied thereto even if it is attached to the computer.

When the computer is switched to the normal operation mode from the backup operation mode, the normal power supply voltage turns ON the switch 12 of the board 10-1 as well as the switches 12 of the other boards 10-2 and 10-3.

As described above, it is possible to perform the maintenance operation in the backup operation mode without affecting the other circuit boards.

FIG. 3 is a block diagram of an essential part of a computer according to an embodiment of the present invention. In FIG. 3, parts that are the same as those shown in FIG. 2 are given the same reference numbers.

The computer includes a power supply unit (PSU) 8, a charging device 9, a battery 10, a DC/DC converter 11 and a group of loads illustrated as a block X. The group of loads shown in FIG. 3 includes memory boards 10-1, 10-2, ..., 10-n. The computer main body or host device of the computer including a central processing unit is omitted for the sake of simplicity.

Each of the memory boards 10-1 through 10-n includes the aforementioned diode D1, the switch and a memory (MS). The memory MS is implemented by one or more memory chips. Although not shown in FIG. 3, each of the memory boards 10-1 through 10-n may have other memories, which are operated in only the normal operation mode.

The power supply unit 8, which functions as the normal operation power supply unit, derives a DC voltage equal to, for example, 3.3 V from an AC voltage equal to, for example 100 V. The DC voltage is supplied, as the normal operation power supply voltage to the power supply line 24. The power supply unit 8 may be equipped with a DC/DC converter, which derives a stabilized DC voltage from the DC voltage initially derived from the AC voltage.

The charging device 9 charges up the battery 10, and connects the battery to the DC/DC converter 11 in the backup operation mode. More particularly, while the charging device 9 is receiving the AC voltage in order to charge up the battery 10, the device 9 is kept disconnected from the DC/DC converter 11. In the backup mode, the DC/DC converter 11 is connected to the battery 10 and converts the DC voltage from the battery 10 into a stabilized DC voltage, which serves as the backup operation power supply voltage equal to, for example, 3.3 V. The DC voltage output by the DC/DC converter is applied to the power supply line 25.

The normal operation power supply line 24 is connected to the memories MS of the boards 10-1 through 10-n via the respective diodes D1. The backup operation power supply line 25 is connected to the memories of the boards 10-1 through 10-n via the respective switches 12.

In the normal operation mode, the normal operation power supply voltage generated by the power supply unit 8 is applied to the memories MS via the power supply line 24, the diodes D1 and nodes P. In the backup operation mode, the backup operation power supply voltage generated by the battery 10 and converted by the DC/DC converter 11 is applied to the memories MS via the power supply line 25, the switches 12 and the nodes P.

The diodes D1 function to prevent the current flowing from the power supply line 25 from being supplied to the power supply line 24. The switches 12 function to maintain the backup mode.

As has been described previously, each of the memory boards 10-1 through 10-n may have other memories or circuits (not shown) which are operated only in the normal operation mode. As will be described later, these memories or circuits on the memory boards 10-1 through 10-n are connected to the normal operation power supply line 24 via mode setting switches (not shown). When the mode setting switches are set to the normal operation mode in response to an instruction from the main body or host device of the computer (not shown in FIG. 3), all the memories or circuits on the boards 10-1 through 10-n are supplied with the normal operation power supply voltage. In the normal operation mode, the charging device 9 charges up the battery 10, and no electricity is supplied to the power supply line 25. When the mode setting switches are set to the backup operation mode, these switches are turned OFF (opened) so that the memories or circuits are disconnected from the power supply line 24. In the backup operation mode, no electricity is supplied to the power supply line 24.

When the computer is switched from the backup operation mode to the normal operation mode, the mode setting switches are turned ON so that all the memories or circuits on the boards 10-1 through 10-n are supplied with electricity.

When the boards 10-1 through 10-n are disconnected from the lines 24 and 25 in the backup operation mode, the mode setting switches are switched to the normal operation mode from the backup operation mode (closed). Further, the switches 12 of the boards 10-1 through 10-n are opened when disconnecting the boards from the power supply lines 24 and 25. Even when the boards 10-1 through 10-n are connected to the lines 24 and 25 again, the switches 12 thereof are maintained in the open state. It will be noted that each of the memory boards 10-1 through 10-n consumes power as much as, for example, approximately one-tenth of the power consumed in the normal operation mode.

A description will now be given, with reference to FIGS. 4A and 4B, of a first example of the switches 12 and its operation.

Figure 4A:
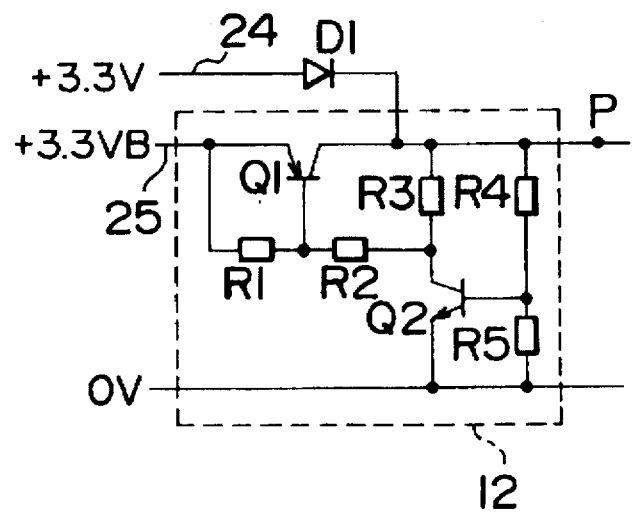
FIG. 4A is a circuit diagram of a first example of a switch shown in FIG. 3.

The switch 12 shown in FIG. 4A is made up of transistors Q1 and Q2, and resistors R1 through R5. The anode of the diode D1 is connected to the normal operation power supply line 4, and the cathode thereof is connected to the node P. The emitter of the transistor Q1 is connected to the backup operation power supply line 25 carrying the backup voltage 3.3 V, and the collector thereof is connected to the node P. The base of the transistor Q1 is connected to a node at which the resistors R1 and R2 are connected together. The emitter of the transistor Q2 is connected to a ground line (GND) set at a potential of 0 V, and the collector thereof is coupled to the node P via the resistor R3. The base of the transistor Q2 is connected to a node at which the resistors R4 and R5 are connected together.

Figure 4B:
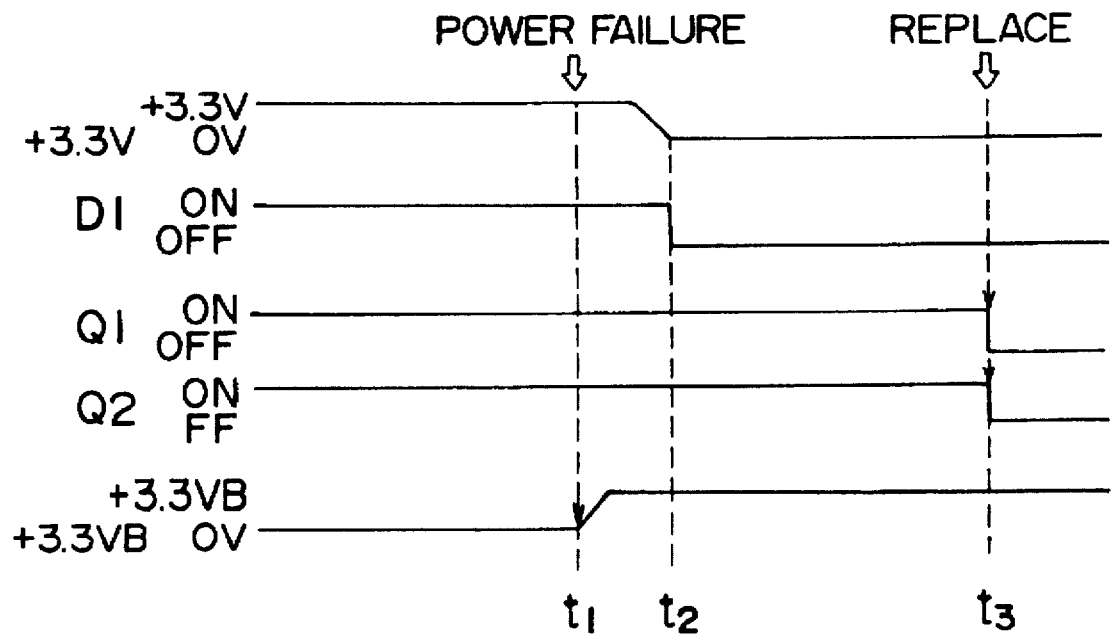
FIG. 4B is a waveform diagram of the operation of the first example of the switch shown in FIG. 3.

Referring to FIG. 4B, the normal operation power supply voltage carried via the line 24 is equal to +3.3 V, and the backup operation power supply voltage carried via the line 25 is equal to 0 V. In this state, a current from the line 24 passes through the diode D1 and the transistor Q2, so that the transistor Q2 is ON. At this time, the transistor Q1 is in a state in which a collector current will flow therein if the backup operation power supply voltage of 3.3 V is applied to the emitter of the transistor Q1.

It will now be assumed that a power failure (or a power cut) occurs at a time $t_1$. At the time $t_1$, the backup operation power supply voltage starts to rise and becomes equal to 3.3 V. A current starts from the emitter to collector of the transistor Q1, so that the transistors Q1 and Q2 are maintained in the ON state. At a time $t_2$, the supply of the normal operation power supply voltage is stopped. During the transient period between the times $t_1$ and $t_2$, the normal operation power supply voltage and the backup operation power supply voltage are concurrently supplied.

At the time $t_2$, the supply of the normal operation power supply voltage is stopped and the potential thereof becomes zero volts. After the time $t_2$, the memory connected to the node P is supplied with the 3.3 V backup operation power supply voltage carried via the line 25, and information stored therein cannot be lost. That is, the memory connected to the node P is continuously supplied with the voltage 3.3 V without any interruption.

It will further be assumed that the memory board on which the circuit shown in FIG. 4A is mounted is detached from a corresponding connector of the computer at a time $t_3$. The supply of the backup operation power supply voltage to the switch 12 is stopped, so that the transistors Q1 and Q2 are turned OFF. If the repaired memory board or a new one is attached to the above connector, the attached board receives the backup operation power supply voltage. However, the potential of the normal operation power supply line 24 is still zero volts. Hence, the transistor Q2 is retained in the OFF state and the transistor Q1 is also retained in the OFF state. That is, the transistors Q1 and Q2 are OFF until the supply of the normal operation power supply voltage is started. In this way, the memory board attached to the computer in the backup mode does not operate. Hence, no power is consumed in the attached board.

The memories or circuits other than the memory connected to the node P does not consume any power because the normal power supply voltage is not supplied to the board in the backup mode.

Figure 5A:
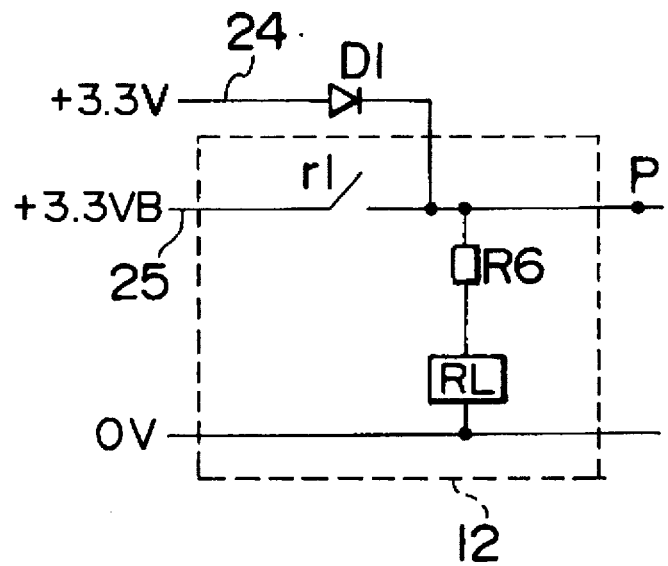
FIG. 5A is a circuit diagram of a second example of the switch shown in FIG. 3.
Figure 5B:
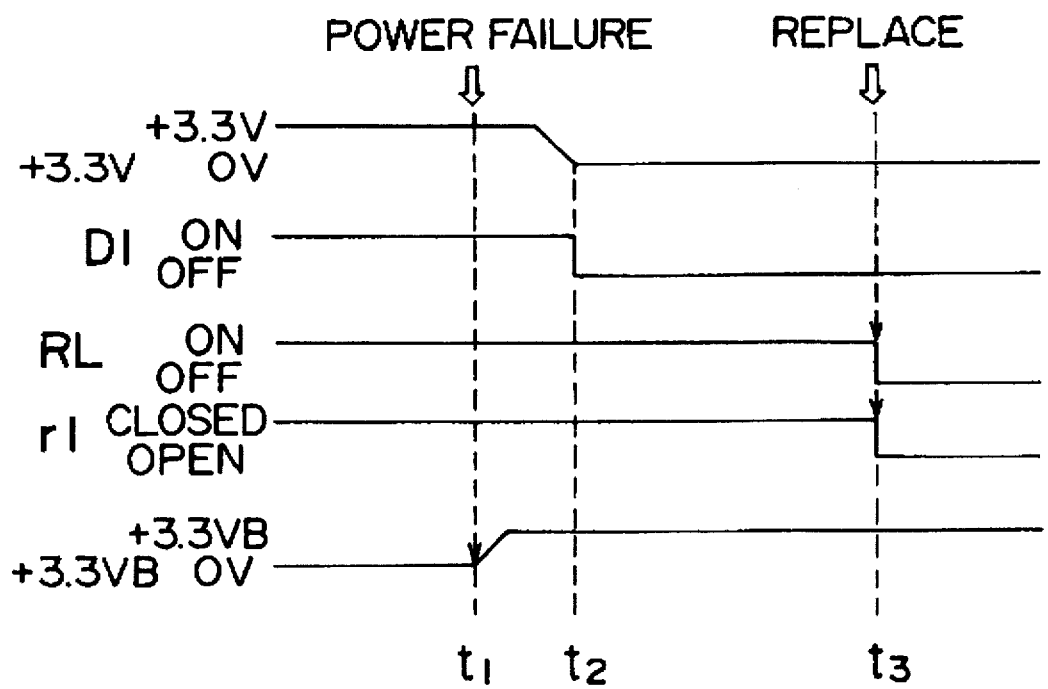
FIG. 5B is a waveform diagram of the operation of the second example of the switch shown in FIG. 5A.

FIG. 5A is a block diagram of a second example of the switch 12 mounted on each memory board, and FIG. 5B is a waveform diagram of the operation of the switch shown in FIG. 5B. The switch 12 shown in FIG. 5A is made up of a relay having a coil RL and a switch r1, and a resistor R6. The anode of the diode D1 is connected to the normal operation power supply line 24, and the cathode thereof is connected to the node P. A series circuit of the resistor R6 and the coil RL is connected between the node P and the ground line. A first contact of the switch r1 is connected to the backup operation power supply line 25, and a second contact thereof is connected to the node P.

In the normal operation mode, the normal operation power supply line 24 is set at 3.3 V, and the backup operation power supply line 25 is set at 0 V. A current passes through the diode D1, the resistor R6 and the coil RL. In this state, the switch r1 is in the closed state. The memory connected to the node P is driven by the normal power supply voltage.

When a power failure occurs at the time $t_1$, the backup operation power supply voltage starts to rise and then becomes equal to 3.3 V. At the time $t_2$, the supply of the normal power supply voltage is stopped. During the transient period, the normal power supply voltage is also supplied continuously. After the time $t_2$, only the backup operation power supply voltage is applied to the node P. The current still flows in the series circuit of the resistor R6 and the coil RL, so that the switch r1 is maintained in the closed state. That is, the current state of the relay is maintained by the self-holding function thereof. After the time $t_2$, the memory board on which the switch 12 shown in Fig. 5A is mounted operates in the backup mode.

When the memory board of concern is detached at the time $t_3$, the supply of the backup operation power supply voltage to the switch 12 is stopped, and hence the switch r1 is opened. When the repaired memory board or a new one is attached to the computer maintained in the backup mode, no current flows in the coil RL of the relay. Hence, the repaired or new memory board does not operate, and hence no power is consumed therein. When the supply of the normal operation power supply voltage is started again, the relay is operated and the switch r1 is closed. Hence, the memory board can operate in the normal operation mode.

Figure 6A:
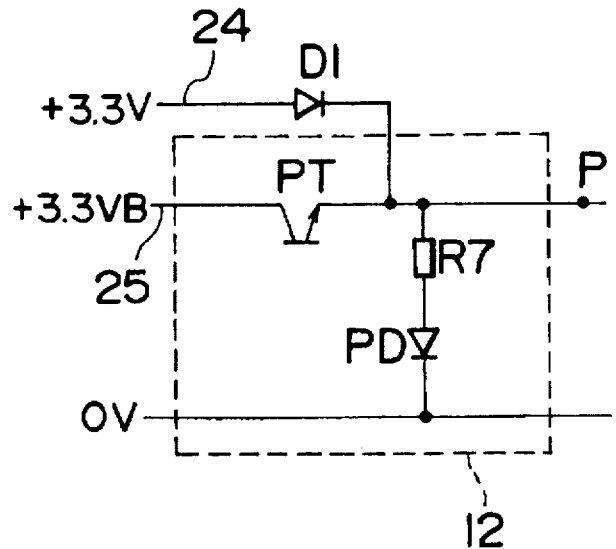
FIG. 6A is a circuit diagram of a third example of the switch shown in FIG. 3.
Figure 6B:
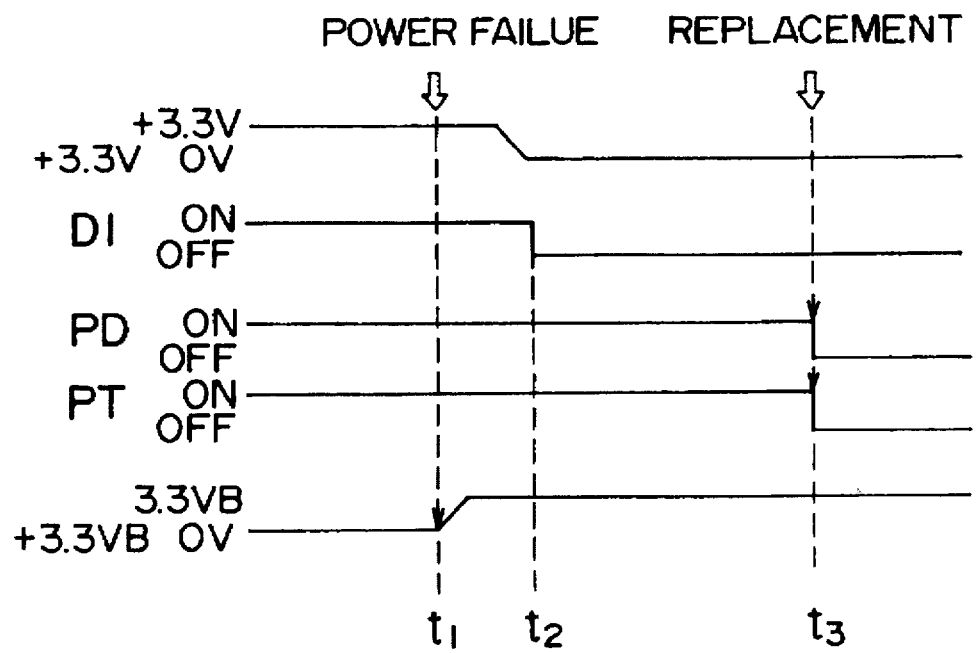
FIG. 6B is a waveform diagram of the operation of the third example of the switch shown in FIG. 6A.

FIG. 6A is a block diagram of a third example of the switch 12, and FIG. 6B is a waveform diagram showing the operation of the switch shown in FIG. 6A. The switch shown in FIG. 6A includes a photocoupler made up of a photodiode PD and a phototransistor PT, and a resistor R7. A series circuit of the resistor R7 and the photodiode PD is connected between the node P and the ground line. The collector of the phototransistor PT is connected to the backup operation power supply line 25, and the cathode thereof is connected to the node P.

Referring to FIG. 6B, in the normal operation mode, the normal operation power supply line 24 is set at 3.3 V, and the backup operation power supply line 25 is set at 0 V. A current passes through the diode D1, the resistor R7 and the photodiode PD. In this state, the phototransistor PT is in the conducting state. The memory connected to the node P is driven by the normal power supply voltage.

When a power failure occurs at the time $t_1$, the backup operation power supply voltage starts to rise and then becomes equal to 3.3 V. At the time $t_2$, the supply of the normal power supply voltage is stopped. During the transient period, the normal power supply voltage is also supplied continuously. After the time $t_2$, only the backup operation power supply voltage is applied to the node P. The current still flows in the series circuit of the resistor R7 and the photodiode PD, so that the phototransistor PT is maintained in the conducting state. After the time $t_2$, the memory board on which the switch 12 shown in FIG. 6A is mounted operates in the backup mode.

When the memory board of concern is detached at the time $t_3$, the supply of the backup operation power supply voltage to the switch 12 is stopped, and hence the photodiode PD and the phototransistor PT are turned OFF. When the repaired memory board or a new one is attached to the computer maintained in the backup mode, no current flows in the photodiode PD. Hence, the repaired or new memory board does not operate, and hence no power is consumed therein. When the supply of the normal operation power supply voltage is started again, the photodiode PD is turned ON and the phototransistor PT is turned ON. Hence, the memory board can operate in the normal operation mode.

The switch 12 is not limited to the configurations shown in FIGS. 4A, 5A and 6A. For example, the bipolar transistors Q1 and Q2 shown in FIG. 4A can be replaced by another type of transistors, such as MOS FETs (Metal Oxide Semiconductor Field Effect Transistors). The transistors can be replaced by another types of switching elements, such as silicon controlled rectifiers. The photocoupler shown in FIG. 6A can be replaced by a combination of another light-emitting element and another light-receiving element.

FIG. 7 is a block diagram of an example of the overall computer according to the present invention. The computer shown in FIG. 7 includes a main body (frame) or host device 31, which corresponds to, for example, a microprocessor or the combination of a CPU and its peripheral circuits such as a RAM and a ROM. The computer main body 31 includes a register 31a, which will be described in detail later. The computer includes a first power supply unit (PSU-A) 35, and a second power supply unit (PSU-B) 36. The first power supply unit 35 drives a group A of loads, which are driven only in the normal operation mode. The second power supply unit 36 drives a group B of loads, which include loads operable in the backup operation mode. The load group B corresponds to the block X having the memory boards 10-1 through 10-n shown in FIG. 3.

The power supply unit 35 derives DC voltages (for example, +5 V, +12 V, −5.2 V and +3.3 V) from an AC voltage applied to a terminal 29. The DC voltages thus generated can be supplied to the load group 43 via power supply lines 40. The power supply unit 35 and the terminal 29 are connected by a power supply line 34 in which a filter (FIL) 32 and circuit breakers CB1 and CB2 are provided. The power supply unit 35 is turned ON when a flag stored in part A of the register 31a of the computer main body 31 is equal to, for example, 1.

The power supply unit 36 derives DC voltages (for example, +5 V, +12 V and two 3.3 V systems (3.3 V1 and 3.3 V2)) from an AC voltage applied to a terminal, 29. The DC voltages thus generated can be respectively supplied to the load group 44 via backup operation power supply lines 41. The power supply unit 36 is connected to the filter 32 via the circuit breakers CB1 and CB3. The power supply unit 35 is turned ON when a flag stored in part B of the register 31a of the computer main body 31 is equal to, for example, 1. The computer main body 31 can control the load groups 43 and 44 via signal lines 50. For example, data can be transferred between the computer main body 31 and the load groups 43 and 44 via the signal lines 50.

A battery charger (CHG) 38 derives a DC voltage from an AC voltage applied to a terminal 30 and supplied to the charger 38 via a filter (FIL) 33 and a circuit breaker CB4, and charges up a battery (BATT) 39 by the DC voltage. A circuit breaker CB5 is provide between the battery charger 38 and the battery 39. The battery charger 38 has the function of making the connection between the battery charger 38 and the battery 39 or the connection between the battery 39 and a backup operation power supply line 42.

Figure 8:
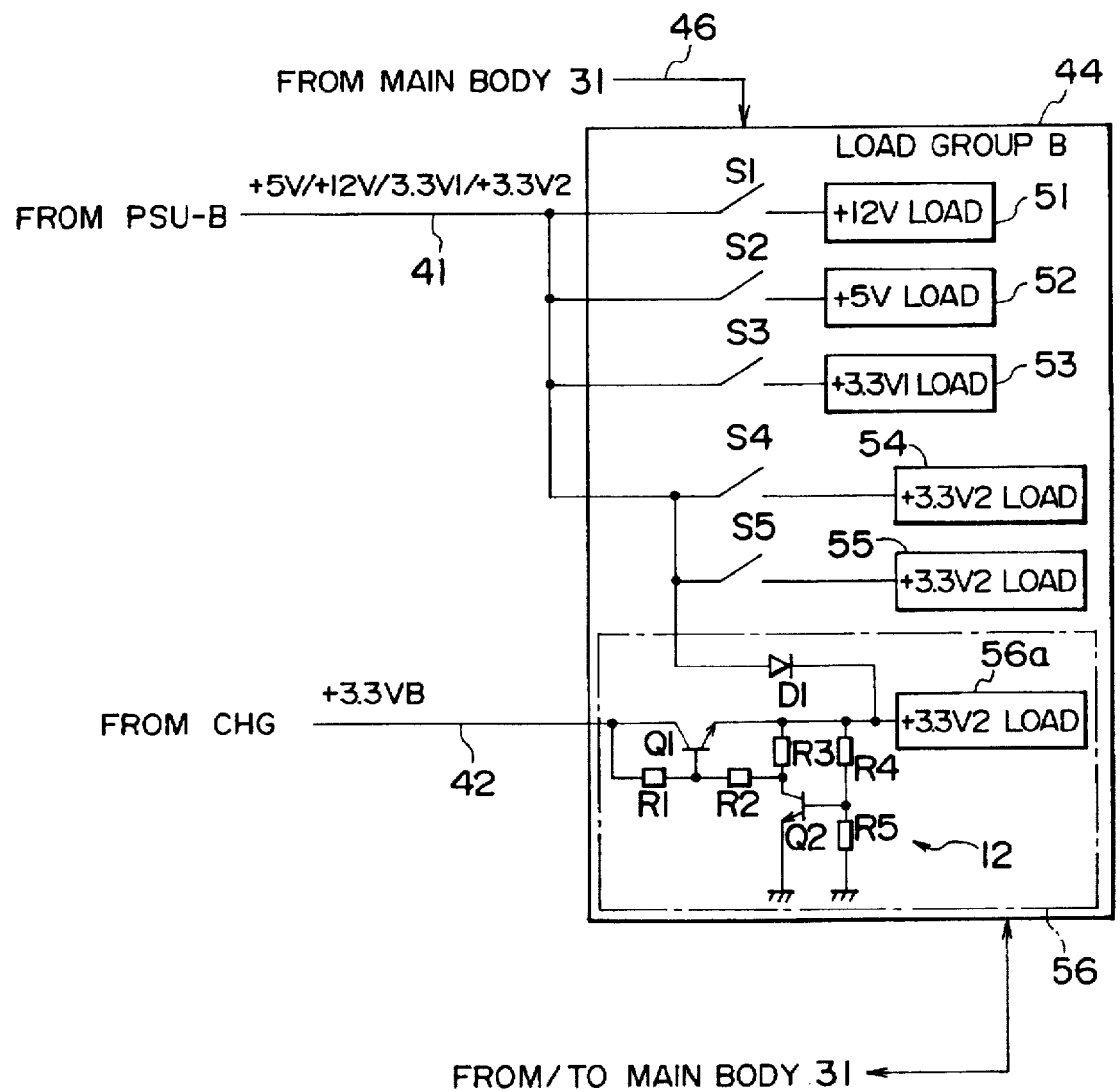
FIG. 8 is a block diagram of a group B of loads shown in FIG. 7.

FIG. 8 is a block diagram of an example of the load group B (block 44) shown in FIG. 7. The load group B includes loads 51, 52 and 53 respectively driven by the DC power supply voltages +12 V, +5 V and +3.3 V supplied from the power supply unit (PSU-B) 36. The loads 51, 52 and 53 are connected to the normal operation power supply lines 41 via switches S1, S2 and S3, respectively. It will be noted that the lines 41 are shown in FIG. 8 as if they are formed by a single line for the sake of convenience. The +12 V load 51 is, for example, a fan for cooling the computer. The +5 V load 52 is, for example, a TTL (Transistor Transistor Logic) circuit of the computer. The +3.3 V load 53 is, for example, a receiver for receiving signals supplied from the outside of the load group B.

Further, the load group B includes loads 54 and 55 respectively driven by the DC power supply voltage +3.3 V supplied from the power supply unit (PSU-B) 36. The loads 54 and 55 are connected to the normal operation power supply lines 41 via switches S4 and S5, respectively. The loads 54 and 55 are, for example, memory boards including a plurality of memory chips.

In the backup mode, the switches S1 through. S5 are turned OFF by writing a flag (for example, 1) into the corresponding part of the register 31a (FIG. 7).

Furthermore, the load group B includes a load 56 driven by the DC power supply voltage +3.3 V supplied from the power supply unit 36 or the battery 39 (FIG. 7) via the battery charger 38. The load 56 is, for example, a memory board on which a load 56a including a plurality of memory chips, and the switch 12 are mounted. In the backup mode, all the memory chips of the load 56a on the memory board 56 are supplied from the backup operation power supply voltage via the switch 12.

FIG. 9 is a block diagram of a load 57, which corresponds to, for example, a memory board. The load 57 includes loads 57a, 57b and 57c respectively driven by the power supply voltage +3.3 V. Each of the loads 57a corresponds to, for example, one memory chip or a group of memory chips. The loads 57a and 57b are coupled to the normal operation power supply line 41 via switches S6 and S7, which are opened in the backup operation mode. That is, information stored in the memories of the loads is allowed to be lost in the backup operation mode. The load 57c is connected to the normal operation power supply line 41 via the diode and the backup operation power supply line 42 via the switch 12. In the backup mode, the backup operation power supply voltage is supplied to the load 57c via the switch 12.

It will be noted that the loads are not limited to the memory boards but include other types of circuit boards needed to operate in the backup operation mode.

According to the present invention, the following effects can be obtained.

First, in information processing devices such as computers operable in the backup operation mode, the backup operation power supply voltage is applied to a new circuit board or a repaired circuit board when the computer is maintained in the backup operation mode. However, the on-board switch is maintained in the OFF state, so that no power supply voltage can be applied to the load of the board. Hence, no power is consumed in the board, and the maintenance operation can be performed without affecting the backup operation power supply unit such as a battery.

Second, the circuit boards can be replaced in the backup mode. It will be noted that such a replacement is conventionally inhibited. That is, the maintenance operation can be efficiently performed anytime.

Third, the repaired or new circuit boards cannot be operated until they are set to the normal operation mode. However, in this regard, there is no problem because such a maintenance operation is carried out due to a fault in the original circuit board and the replaced or new circuit boards can operate in the normal mode.

The present invention is not limited to the specifically disclosed embodiments, and variations and modifications may be made without departing from the scope of the present invention.

What is claimed is:

1. A circuit board adapted to an information processing device comprising:

a load mounted on the circuit board and supplied with a normal operation power supply voltage in a normal operation mode and a backup operation power supply voltage in a backup operation mode; and a switch coupled to the load, the switch having a first state in which the backup operation power supply voltage is allowed to be applied to the load in the backup operation mode, and a second state in which the backup operation power supply voltage is inhibited from being applied to the load in the normal operation mode or when no electricity is supplied to the circuit board, the second state being held as long as the backup operation power supply voltage is applied to the switch after a supply of electricity is started, that the backup operation power supply voltage is inhibited from being applied to the load via the switch.

2. The circuit board as claimed in claim 1, wherein said switch holds the first state while both the normal operation power supply voltage and the backup operation power supply voltage are applied to the circuit board.

3. The circuit board as claimed in claim 1, wherein said load comprises a memory so that the circuit board is a memory board.

4. The circuit board as claimed in claim 1, further comprising another load operating only in the normal operation mode.

5. The circuit board as claimed in claim 1, wherein said circuit board receives the normal operation power supply voltage via a first power supply line and the backup operation power supply voltage via a second power supply line.

6. The circuit board as claimed in claim 1, wherein said switch comprises a switch circuit which is turned ON upon receipt of the normal operation power supply voltage so that the backup operation power supply voltage is allowed to be applied to the load, and which then holds an ON state as long as the backup operation power supply voltage is supplied.

7. The circuit board as claimed in claim 1, wherein said switch comprises:
    a first transistor circuit driven by the normal power supply voltage or the backup operation power supply voltage; and
    a second transistor circuit which is driven by the first transistor circuit and allows the backup operation power supply voltage to be applied to the load as long as the first transistor circuit receives the backup operation power supply voltage via the second transistor circuit.

8. The circuit board as claimed in claim 1, wherein said switch comprises:
    a relay having a coil driven by the normal operation power supply voltage or the backup operation power supply voltage; and
    a switch circuit which is closed to allow the backup operation power supply voltage to be applied to the load as long as the coil receives the backup operation power supply voltage via the switch circuit.

9. The circuit board as claimed in claim 1, wherein said switch comprises:
    a photodiode having a coil driven by the normal operation power supply voltage or the backup operation power supply voltage; and
    a phototransistor which is turned ON to allow the backup operation power supply voltage to be applied to the load as long as the photodiode receives the backup operation power supply voltage via the phototransistor.

10. The circuit board as claimed in claim 1, further comprising a diode allowing the normal operation power supply voltage to the load and preventing the backup operation power supply voltage from flowing in a power supply line via which the normal operation power supply voltage is carried.

11. An information processing device comprising:
    a main body performing information processing;
    a circuit board controlled by the main body;
    a first power supply line to which a normal power supply voltage is applied to the circuit board; and
    a second power supply line to which a backup power supply voltage is applied to the circuit board,
    said circuit board comprising:
        a load supplied with the normal operation power supply voltage in a normal operation mode and the backup operation power supply voltage in a backup operation mode; and
        a switch coupled to the load, the switch having a first state in which the backup operation power supply voltage is allowed to be applied to the load in the backup operation mode and a second state in which the backup operation power supply voltage is inhibited from being applied to the load in the normal operation mode or when no electricity is supplied to the circuit board,
        the second state being held as long as the backup operation power supply voltage is applied to the switch after a supply of electricity is started, so that the backup operation power supply voltage is inhibited from being applied to the load via the switch.

12. The information processing device as claimed in claim 11, wherein said switch holds the first state while both the normal operation power supply voltage and the backup operation power supply voltage are applied to the circuit board.

13. The information processing device as claimed in claim 11, wherein said load comprises a memory so that the circuit board is a memory board.

14. The information processing device as claimed in claim 11, wherein said circuit board comprises another load operating only in the normal operation mode.

15. The information processing device as claimed in claim 11, wherein said switch comprises a switch circuit which is turned ON upon receipt of the normal operation power supply voltage so that the backup operation power supply voltage is allowed to be applied to the load, and which then holds an ON state as long as the backup operation power supply voltage supplied.

16. The information processing device as claimed in claim 11, wherein said switch comprises:
    a first transistor circuit driven by the normal power supply voltage or the backup operation power supply voltage; and
    a second transistor circuit which is driven by the first transistor circuit and allows the backup operation power supply voltage to be applied to the load as long as the first transistor circuit receives the backup operation power supply voltage via the second transistor circuit.

17. The information processing device as claimed in claim 11, wherein said switch comprises:
    a relay having a coil driven by the normal operation power supply voltage or the backup operation power supply voltage; and
    a switch circuit which is closed to allow the backup operation power supply voltage to be applied to the load as long as the coil receives the backup operation power supply voltage via the switch circuit.

18. The information processing device as claimed in claim 11, wherein said switch comprises:
    a photodiode having a coil driven by the normal operation power supply voltage or the backup operation power supply voltage; and
    a phototransistor which is turned ON to allow the backup operation power supply voltage to be applied to the load as long as the photodiode receives the backup operation power supply voltage via the phototransistor.

19. The information processing device as claimed in claim 11, further comprising a diode allowing the normal operation power supply voltage to the load and preventing the backup operation power supply voltage from flowing in the first power supply line.

20. A method for removing and replacing a circuit board in an information processing device, said method comprising the steps of:

applying a normal power supply voltage to a load on the circuit board;

removing said normal power supply voltage and simultaneously applying a backup power supply voltage to said load;

switching a switch so that the backup power supply voltage does not reach said load;

removing and replacing said circuit board after repairing or replacing the circuit board; and maintaining the switch in a position so that no backup power is supplied to the load.

* * * * *

UNITED STATES PATENT AND TRADEMARK OFFICE
CERTIFICATE OF CORRECTION

PATENT NO. : 5,638,289
DATED : June 10, 1997
INVENTOR(S) : YAMADA et al.

It is certified that error appears in the above-identified patent and that said Letters Patent is hereby corrected as shown below:

Col. 5, line 31, after "voltage" insert --,--.

Col. 7, line 61, change "Fi$_G$." to --FIG.--.

Col. 9, line 33, change "provide" to --provided--;
line 60, after "through" delete ".".

Col. 12, line 32 (Claim 15, line 7), after "voltage" insert --is--.

Signed and Sealed this

Ninth Day of September, 1997

Attest:

BRUCE LEHMAN

Attesting Officer   Commissioner of Patents and Trademarks